(12) United States Patent
Rothaug

(10) Patent No.: US 9,115,757 B2
(45) Date of Patent: Aug. 25, 2015

(54) BEARING FOR A SHAFT OF A PRINTING TECHNOLOGY MACHINE

(71) Applicant: HEIDELBERGER DRUCKMASCHINEN AG, Heidelberg (DE)

(72) Inventor: Juergen Rothaug, Nussloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/098,788

(22) Filed: Dec. 6, 2013

(65) Prior Publication Data

US 2014/0161383 A1 Jun. 12, 2014

(30) Foreign Application Priority Data

Dec. 7, 2012 (DE) .................... 10 2012 023 977

(51) Int. Cl.
| | |
|---|---|
| *F16C 19/10* | (2006.01) |
| *F16C 35/077* | (2006.01) |
| *F16C 19/30* | (2006.01) |
| *F16C 25/08* | (2006.01) |
| *F16C 35/04* | (2006.01) |

(52) U.S. Cl.
CPC .............. *F16C 35/077* (2013.01); *F16C 19/30* (2013.01); *F16C 19/305* (2013.01); *F16C 25/083* (2013.01); *F16C 35/042* (2013.01); *F16C 2226/10* (2013.01); *F16C 2324/16* (2013.01)

(58) Field of Classification Search
CPC ...... F16C 35/042; F16C 35/06; F16C 35/061; F16C 35/067; F16C 35/077; F16C 19/30; F16C 19/305; F16C 19/32; F16C 25/083; F16C 2324/16; F16C 2226/10; F16C 35/07; F16C 35/073; F16C 35/063
USPC ......................................... 384/603, 618–623
See application file for complete search history.

(56) References Cited

U.S. PATENT DOCUMENTS

| | | | | |
|---|---|---|---|---|
| 2,399,669 A | * | 5/1946 | Frauenthal | ..................... 384/621 |
| 3,328,098 A | * | 6/1967 | Budzich | ........................ 384/608 |
| 4,310,205 A | * | 1/1982 | Condon et al. | ................ 384/620 |

(Continued)

FOREIGN PATENT DOCUMENTS

| | | |
|---|---|---|
| DE | 10130458 A1 | 9/2002 |
| DE | 102007056880 A1 | 6/2008 |

(Continued)

OTHER PUBLICATIONS

German Patent and Trademark Office Search Report, Dated March 6, 2013.

*Primary Examiner* — Alan B Waits
(74) *Attorney, Agent, or Firm* — Laurence A. Greenberg; Werner H. Stemer; Ralph E. Locher

(57) ABSTRACT

A bearing for a shaft of a printing technology machine includes a bearing housing composed of an upper part and a lower part. The bearing housing has a bore for receiving a rolling-contact bearing for the shaft. The upper part and the lower part are separated by an interstice disposed in the region of the bore. The rolling-contact bearing is an axial bearing including at least one rolling body cage and at least one race washer having an annular shape. The race washer is clamped between the upper part and the lower part, which both exert a radial pressure on an outer circumferential surface of the race washer.

8 Claims, 3 Drawing Sheets

(56) References Cited

U.S. PATENT DOCUMENTS

| | | | |
|---|---|---|---|
| 4,684,267 A * | 8/1987 | Fetouh | 384/294 |
| 5,235,912 A * | 8/1993 | Wieland | 101/409 |
| 5,261,750 A * | 11/1993 | Eckhardt et al. | 384/455 |
| 5,287,623 A * | 2/1994 | Francis et al. | 29/898.062 |
| 5,462,366 A * | 10/1995 | Hausler | 384/457 |
| 5,582,482 A * | 12/1996 | Thom et al. | 384/434 |
| 5,938,349 A * | 8/1999 | Ogawa | 384/615 |
| 6,857,787 B1 | 2/2005 | Meier et al. | |
| 7,112,040 B2 * | 9/2006 | Debeneix et al. | 415/160 |
| 7,963,703 B2 * | 6/2011 | Takamizawa et al. | 384/618 |
| 2002/0031289 A1 * | 3/2002 | Kenney, Jr. | 384/620 |
| 2004/0146233 A1 * | 7/2004 | Lynch et al. | 384/621 |
| 2006/0140525 A1 * | 6/2006 | Giberson | 384/428 |
| 2007/0223854 A1 * | 9/2007 | Waseda et al. | 384/584 |
| 2008/0253708 A1 * | 10/2008 | Dodman et al. | 384/431 |
| 2010/0195945 A1 * | 8/2010 | Abe et al. | 384/450 |
| 2012/0144939 A1 * | 6/2012 | Kullin et al. | 74/25 |

FOREIGN PATENT DOCUMENTS

| | | |
|---|---|---|
| DE | 102008059627 A1 | 7/2009 |
| DE | 102008060292 A1 | 7/2009 |

* cited by examiner

BEARING FOR A SHAFT OF A PRINTING TECHNOLOGY MACHINE

CROSS-REFERENCE TO RELATED APPLICATION

This application claims the priority, under 35 U.S.C. §119, of German Patent Application DE 10 2012 023 977.7, filed Dec. 7, 2012; the prior application is herewith incorporated by reference in its entirety.

BACKGROUND OF THE INVENTION

Field of the Invention

The present invention relates to a bearing or bearing unit for a shaft of a printing technology or graphic arts machine including a bearing housing composed of an upper part and a lower part, a bore provided in the bearing housing to receive a rolling-contact bearing for the shaft, and an interstice located in the region of the bore and separating the upper part and the lower part.

Printing technology machinery includes printing presses and further processing machines in which the printed sheets are further processed. In printing technology machinery, gripper systems are used to hold the sheets while they are being transported. The gripper systems may be disposed on transport drums or chain conveyors. Such gripper systems include gripper fingers and gripper pads associated with each other in pairs. The sheet is clamped between the respective gripper finger and the associated gripper pad. The gripper fingers are disposed on a gripper shaft, the rotation of which causes the gripper fingers to pivot towards and away from the gripper pads to close and open the gripper system.

The gripper shaft is mounted in rolling-contact bearings in bearing housings which are also known as bearing blocks or vertical bearings. German Patent Application DE 10 2007 056 880 A1, for example, describes a gripper shaft that is mounted in bearing blocks through radial bearings. A flange is formed on one end of the gripper shaft. An axial bearing is disposed between the flange and a bearing block. That bearing does not adequately meet the requirement of providing a simple and safe way of mounting and supporting the gripper system.

German Patent Applications DE 10 2008 059 627 A1 and DE 10 2008 060 292 A1 disclose bearing units for gripper shafts wherein the vertical bearings are composed of a respective upper part and a respective lower part. The upper part and the lower part are separated from each other by a fracture splitting line created by so-called cracking or fracture splitting. The fracture splitting line is in the region of a bore provided to receive a rolling-contact bearing for the gripper shaft.

SUMMARY OF THE INVENTION

It is accordingly an object of the invention to provide a bearing for a shaft, in particular for a gripper shaft, in a printing technology machine, which overcomes the hereinafore-mentioned disadvantages of the heretofore-known bearings of this general type and which allows a particularly convenient assembly.

With the foregoing and other objects in view there is provided, in accordance with the invention, a bearing for a shaft in a printing technology machine, comprising a bearing housing and a bore created in the bearing housing. The bearing housing is composed of an upper part and a lower part. The bore is provided to receive a rolling-contact bearing for the shaft. The upper part and the lower part are separated from each other by an interstice, which is located in the region of the bore. The rolling-contact bearing is embodied as an axial bearing and includes at least one rolling body cage and at least one annular race washer. The race washer is locked or clamped between the upper part and the lower part, with both the upper part and the lower part exerting radial pressure on the outer circumferential surface of the race washer.

The bearing of the invention provides easy assembly because it allows the use of divided bearing housings for axial bearings. The axial bearing may now be pre-assembled on the shaft, which is advantageous in view of an easy final assembly. An additional advantage is that the vertical bearing or bearing housing for the axial bearing may be identical with the vertical bearings or bearing housings for the radial bearings of the shaft.

Other features which are considered as characteristic for the invention are set forth in the appended claims, noting that further developments of the bearing unit of the invention that are advantageous in structural and functional terms are described in the dependent claims and become apparent from the following description of preferred exemplary embodiments and the associated drawing.

Although the invention is illustrated and described herein as embodied in a bearing for a shaft in a printing technology machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
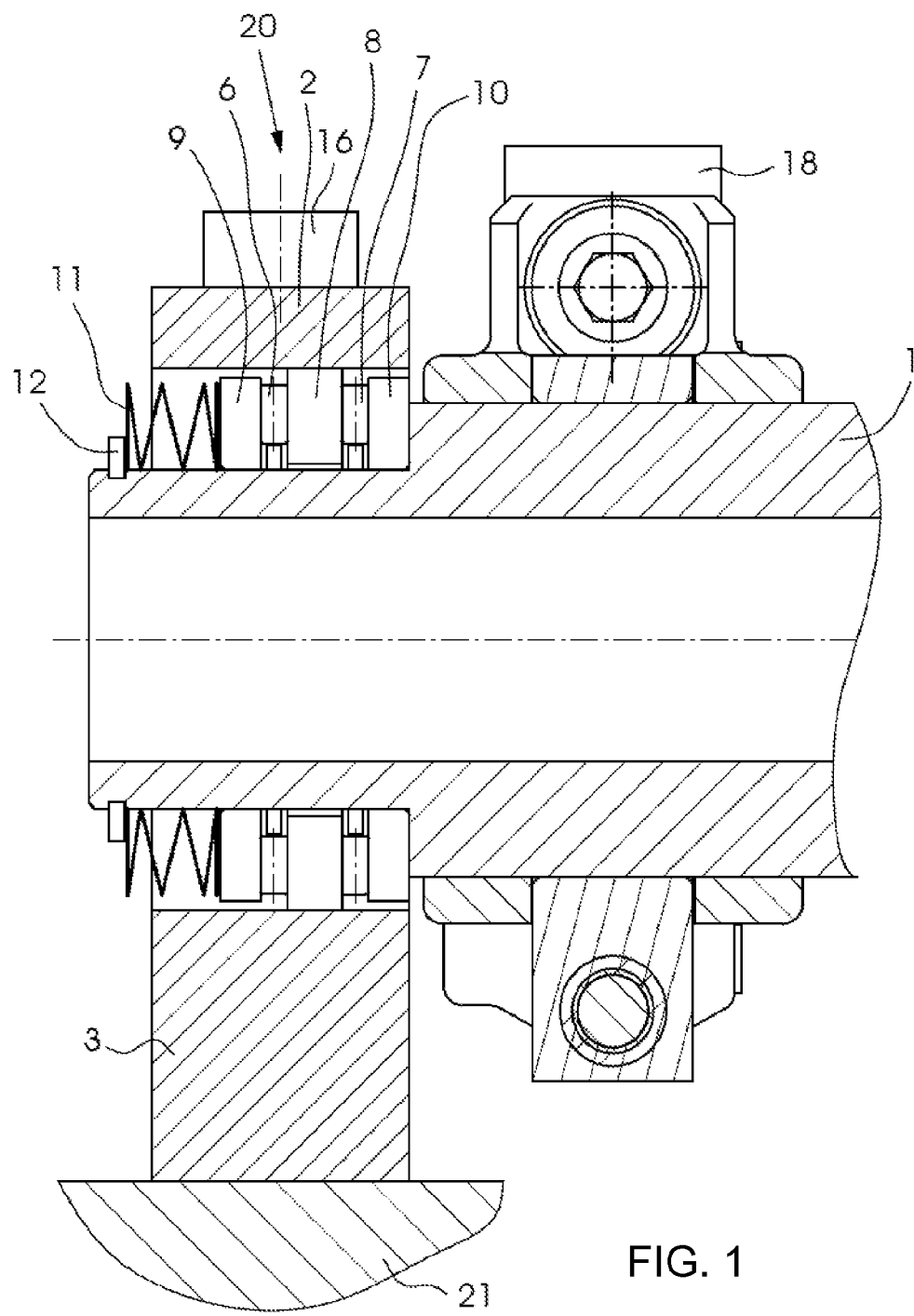
FIGS. 1 and 2 are respective fragmentary, diagrammatic longitudinal-sectional and cross-sectional views of a first exemplary embodiment of the invention, in which a spring for pre-loading a rolling-contact bearing is located on a shaft.
Figure 2:
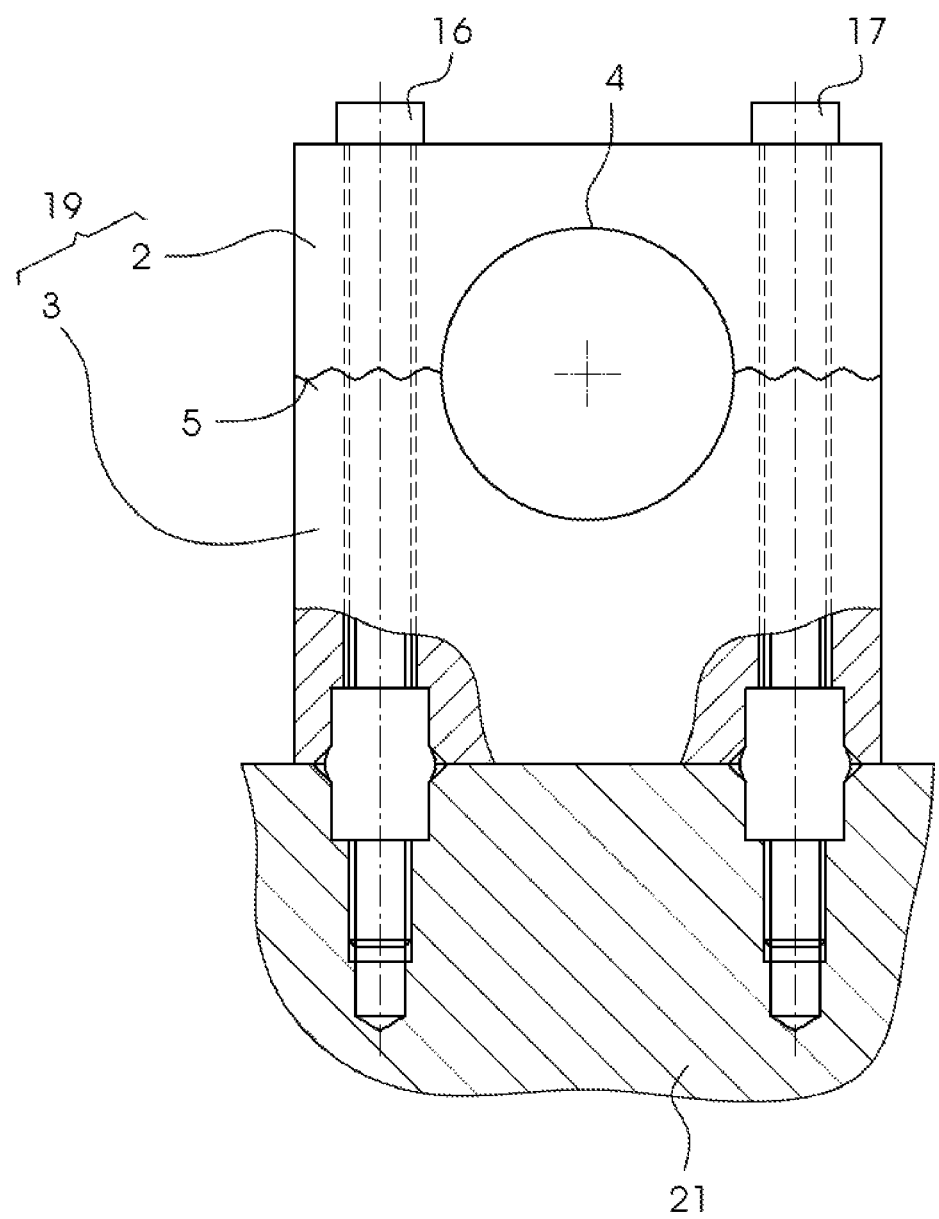

Referring now in detail to the figures of the drawings, in which corresponding components and elements have corresponding reference numerals, and first, particularly, to FIGS. 1 and 2 thereof, there is seen a bearing or bearing unit for a shaft 1 of a printing technology or graphic arts machine. FIG. 1 is a longitudinal-sectional view of the shaft 1 and of the bearing unit. FIG. 2 is a cross-sectional view of a bearing housing 19 of the bearing unit without a shaft. The printing technology machine is a sheet-fed printing press for lithographic offset printing. The shaft 1 is a gripper shaft that carries sheet gripper fingers 18 disposed in a row thereon to clamp printing sheets transported in the printing press. A bore 4 having a central axis which is coaxial with the central axis of the shaft 1 is disposed in the bearing housing 19.

The bearing housing 19 is formed of an upper part 2 and a lower part 3. The two parts 2, 3 are combined at an interstice 5. The interstice 5 is an irregular fracture splitting line created by cracking or fracture splitting. The upper part 2 includes one semicircular half of the bore 4 and the lower part 3 includes the other semicircular half of the bore 4.

The upper part 2 and the lower part 3 are interlocked by two fastening elements 16, 17 to radially clamp a rolling-contact bearing 20 in the bore 4. The two fastening elements 16, 17 are screws that pass through the two parts 2, 3 and are screwed into a drum body 21 of a sheet transport drum that is equipped with a gripper system. The one fastening element 16 is located on one side of the bore 4 and the other fastening element 17 is located on the other side of the bore 4. The two fastening elements 16, 17 are aligned to be axially parallel to each other.

The rolling-contact bearing 20 includes a first rolling body cage 6 and a second rolling body cage 7. Rolling bodies of the first rolling body cage 6 and of the second rolling body cage 7 are rollers or pins, i.e. the rolling-contact bearing 20 is a thrust roller bearing. A central race washer 8 is disposed between the two rolling body cages 6, 7. The rolling bodies of both rolling body cages 6, 7 roll on the central race washer. The central race washer 8 is a so-called housing washer. The first rolling body cage 6 furthermore rolls on a first outer race washer 9, which is pressed against the first rolling body cage 6 by a spring 11. The second rolling body cage 7 exerts pressure on a second outer race washer 10, which is supported on a planar surface or a shoulder of the shaft 1. The two outer race washers 9, 10 are so-called wave washers.

The spring 11 exerts pressure in an axial direction and maintains a pre-load on a package formed of the rolling body cages 6, 7 and the race washer 8, 9, 10. In this pre-loaded condition, that package may be introduced into the lower part 3 before the upper part 2 is fitted onto the lower part 3 at the interstice 5 and clamped in the bearing housing 19 by the fastening elements 16, 17, thus being fixed both in the radial and in the axial direction. The pre-assembled condition of the rolling-contact bearing 20 simplifies the final assembly of the bearing unit to a considerable extent.

The shaft 1 is a hollow shaft. In the assembled state of the bearing, a (non-illustrated) torsion spring or torsion bar spring is disposed in the inner diameter or space of the hollow shaft. The outer diameter of the central race washer 8 and the interior diameter of the bore 4 are dimensioned in such a way that a pressure fit becomes effective between the upper and lower parts 2, 3 and the central race washer 8 when the former two parts 2, 3 are screwed together. This pressure fit causes the central race washer 8 to be firmly clamped between the two parts 2, 3 in the radial direction and thus also to be secured against axial displacement.

The inner diameter of the central race washer 8 and the outer diameter of the component on which the central race washer 8 is placed are dimensioned in such a way that a clearance fit results. In the embodiment shown in FIG. 1, this component is the shaft 1 itself. In the embodiment shown in FIG. 3, this component is a pipe portion 13 that is centrically screwed into the shaft 1. In both embodiments, the spring 11, the two outer race washers 9, 10, and the rolling body cages 6, 7 are likewise fitted on the component.

The spring 11 may be formed of a single spring or of multiple springs in the shape of wave washers or of a single disc spring or of multiple disc springs. Suitable springs are called wave springs/wave washers/sine springs and are marketed by Baumann Federn AG located in Rütti (Switzerland) or by Baumann Springs USA, Inc., located in Grand Prairie, Tex.

In the exemplary embodiment shown in FIG. 1, one end of the spring 12 is supported on the first outer race washer 9 and the other end is supported on a safety ring 12, which is located in a groove formed in the shaft 1.

Figure 3:
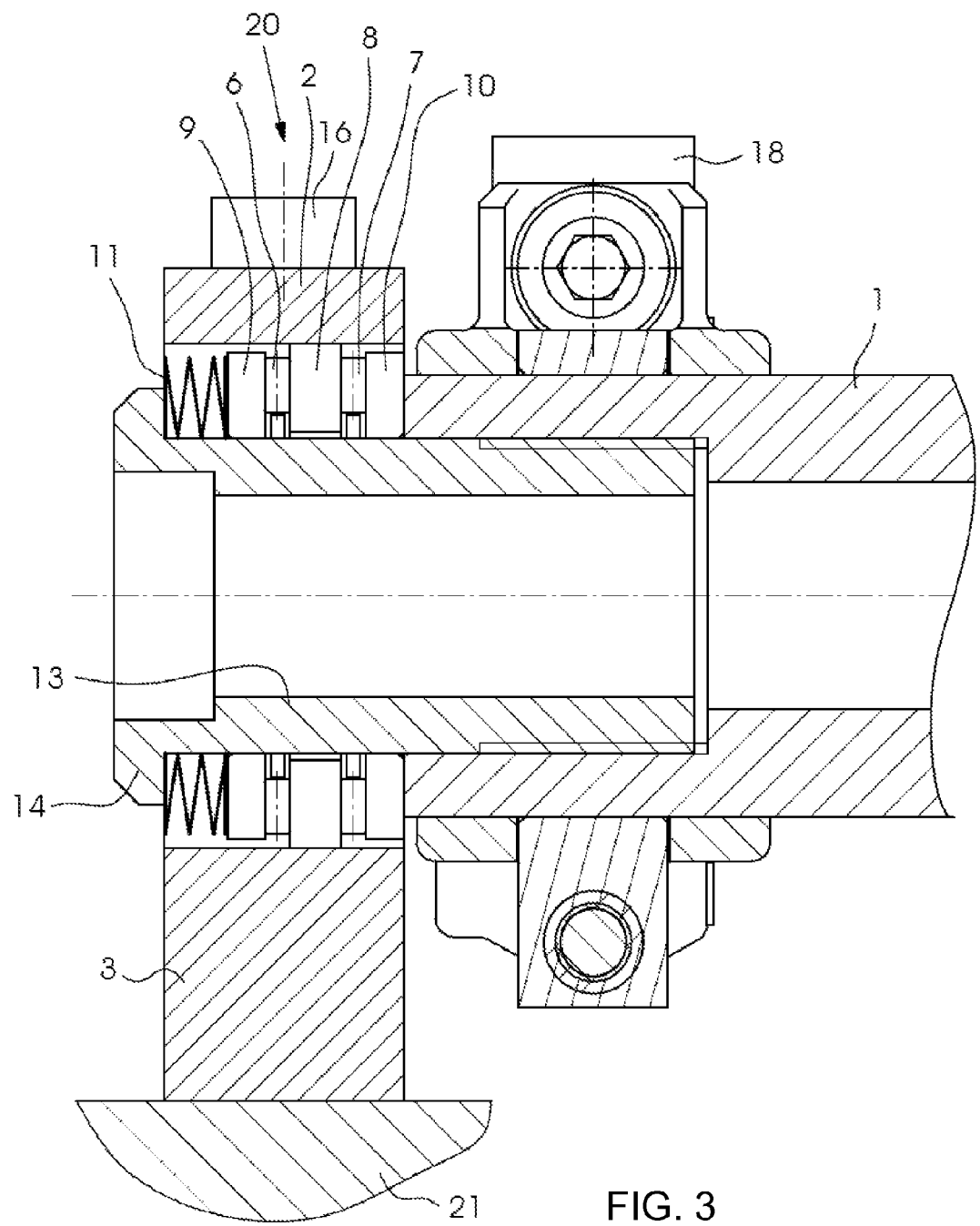
FIG. 3 is a longitudinal-sectional view of a second exemplary embodiment in which the spring is located on a pipe portion that is screwed into the shaft.

In the exemplary embodiment shown in FIG. 3, a distal end of the spring 11, relative to the outer race washer 9, is supported on a flange 14 formed on the pipe section 13.

The exemplary embodiments shown in FIGS. 1 and 3 only differ from each other in the fact that in the exemplary embodiment of FIG. 1, the shaft end is formed by a shoulder integrally molded on the shaft 1, whereas in the embodiment of FIG. 3, the pipe section 13 is provided instead of the shaft shoulder. In both exemplary embodiments, the spring 11 is subject to an axial pre-load in the assembled state.

The invention claimed is:

1. A bearing for a shaft of a printing technology machine, the bearing comprising:
    a bearing housing having a bore formed therein, said bearing housing composed of an upper part and a lower part separated by an interstice located in vicinity of said bore;
    a multi-row rolling-contact bearing for said shaft, said rolling-contact bearing being an axial bearing including at least one rolling body cage and a central race washer having two sides, said at least one rolling body cage including a first rolling body cage contacting one side of said central race washer and a second rolling body cage contacting the other side of said central race washer;
    said rolling-contact bearing including a first outer race washer and a second outer race washer each having an annular shape, said rolling-contact bearing disposed in said bore;
    said first rolling body cage being disposed between said central race washer and said first outer race washer;
    said second rolling body cage being disposed between said central race washer and said second outer race washer;
    said central race washer being clamped between said upper part and said lower part and having an annular shape with an outer circumferential surface; and
    said upper part and said lower part both exerting radial pressure on said outer circumferential surface of said central race washer.

2. The bearing according to claim 1, which further comprises a spring exerting pressure on said first outer race washer to interlock said two rolling body cages with said three race washers in a pre-assembled state.

3. The bearing according to claim 2, wherein:
    the shaft is hollow; and
    said spring is located on the hollow shaft and supported on a safety ring under a pre-load.

4. The bearing according to claim 2, wherein:
    the shaft is hollow; and
    said spring is located on a pipe section coaxially aligned with and screwed into the hollow shaft.

5. The bearing according to claim 2, wherein said spring includes at least one resilient wave washer or at least one disc spring.

6. The bearing according to claim 1, which further comprises:
    two fastening elements being two screws or one screw and one other fastening element;
    said upper part and said lower part being interlocked by said fastening elements; and
    said bore being located between said fastening elements.

7. The bearing according to claim 1, wherein said interstice is an irregular fracture splitting line created by cracking or fracture splitting.

8. A gripper system for a printing technology machine, the gripper system comprising:
    a gripper shaft carrying sheet gripper fingers;
    a bearing for said shaft, said bearing including:

a bearing housing having a bore formed therein, said bearing housing composed of an upper part and a lower part separated by an interstice located in vicinity of said bore;

a multi-row rolling-contact bearing for said shaft, said rolling-contact bearing being an axial bearing including at least one rolling body cage and a central race washer having two sides, said at least one rolling body cage including a first rolling body cage contacting one side of said central race washer and a second rolling body cage contacting the other side of said central race washer;

said rolling-contact bearing including a first outer race washer and a second outer race washer each having an annular shape, said rolling-contact bearing disposed in said bore;

said first rolling body cage being disposed between said central race washer and said first outer race washer;

said second rolling body cage being disposed between said central race washer and said second outer race washer;

said central race washer being clamped between said upper part and said lower part and having an annular shape with an outer circumferential surface; and said upper part and said lower part both exerting radial pressure on said outer circumferential surface of said central race washer.

* * * * *